Sept. 11, 1962 V. F. LANG 3,053,299

CAMERA CARRYING CASE

Filed Feb. 6, 1961 2 Sheets-Sheet 1

VINCENT F. LANG
INVENTOR.

BY R. Frank Smith

Karl T. ...

ATTORNEYS

Sept. 11, 1962 V. F. LANG 3,053,299

CAMERA CARRYING CASE

Filed Feb. 6, 1961 2 Sheets-Sheet 2

VINCENT F. LANG
INVENTOR.

BY R. Frank Smith

Karl T. Haramore

ATTORNEYS

United States Patent Office 3,053,299
Patented Sept. 11, 1962

3,053,299
CAMERA CARRYING CASE
Vincent F. Lang, Rochester, N.Y., assignor to Eastman Kodak Company, Rochester, N.Y., a corporation of New Jersey
Filed Feb. 6, 1961, Ser. No. 87,174
3 Claims. (Cl. 150—52)

The present invention relates to a camera carrying case, and particularly to a camera carrying case which is made in two parts which can be packaged flat in an envelope so that it may be sent through the mail to the customer who, by following simple printed instructions, has merely to fold the parts along prescribed creases and with the use of snap fasteners button the parts together in assembled relation. Since the carrying case is assembled by the purchaser, and can be shipped without requiring elaborate packaging and shipping costs on the part of the manufacturer, a very inexpensive carrying case is made available to the public.

One object of the present invention is to provide a camera carrying case which can be supplied to the customer in a knocked-down condition to be assembled by him.

Another object is to provide a carrying case which is so designed that in its knocked-down, or disassembled, condition the parts lie flat so that they can be packaged and mailed or shipped in a flat envelope.

And still another object is to provide a camera carrying case which, by virtue of its design, is very inexpensive since the purchaser has to pay for no assembly costs and only a minimum shipping charge.

These objects can be carried out by the use of apparatus shown in the accompanying drawings, wherein like reference characters note like parts throughout.

Figures 1, 2:
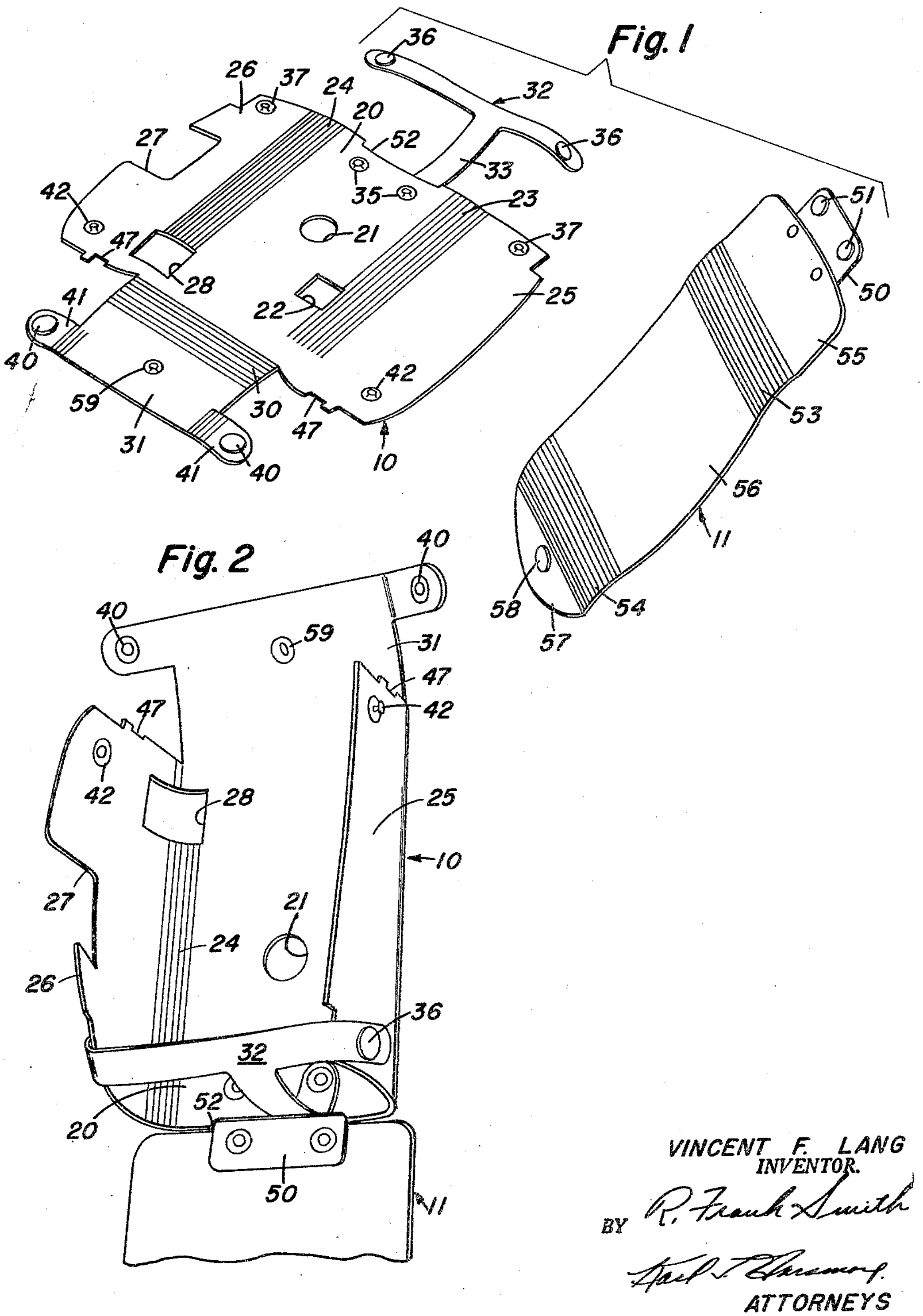
FIG. 1 is a perspective view showing the two parts which go to make up a camera carrying case constructed in accordance with a preferred embodiment of the present invention, and in the flat condition in which these parts are supplied by the manufacturer.
FIG. 2 is a perspective view showing the case partly assembled and ready to have a camera placed therein.
Figure 3:
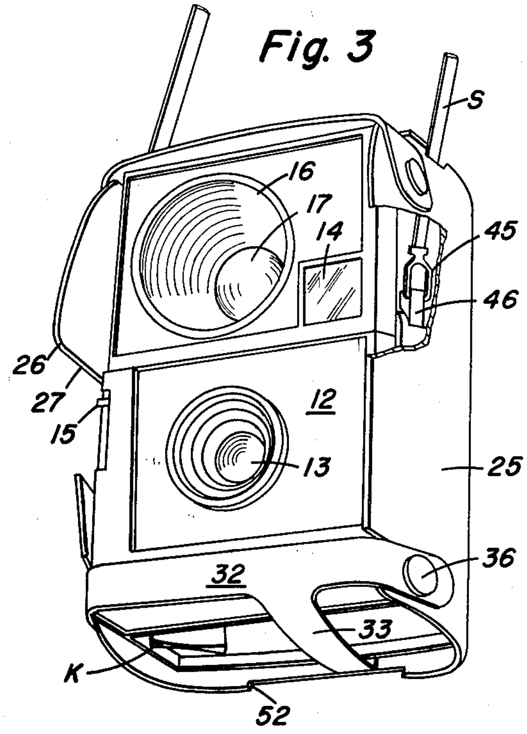
FIG. 3 is a perspective view showing the case section completely assembled, and with a camera therein, but with the cover flap detached.

Referring now to the drawings, the camera carrying case comprises two separate parts, a case section 10 and a cover flap 11, each of which are stamped from a simulated leather, or like material, and are packaged in the flat condition shown in FIG. 1 so that they can be packaged and mailed in a flat envelope. In order to comprehend the reason for the different openings provided in the case section of this camera carrying case it is necessary to understand what camera this particular case is adapted to accommodate and permit its operation while contained therein. As shown in FIG. 3, this carrying case is designed to accommodate a box type camera 12 the front wall of which includes a lens 13, the front window 14 of a directional viewfinder, and a reciprocal shutter trigger 15 on its side wall. This camera also has a built-in flash unit including a reflector 16, within which there is a socket in which a lamp 17 may be inserted, and at the top of the same side wall which includes the shutter trigger there is a lamp ejector lever, not shown, which must be actuated to permit ejection of a burned lamp from the socket. The camera also has the usual red window, not shown, in its back wall through which the exposure numbers on the film may be seen.

Now referring back to FIG. 1, central area 20 of the case section defines the back wall of the assembled case against which the back of the camera rests when it is inserted into the assembled case. This back wall has a circular opening 21 which is adapted to line up with the red window in the camera back, and also includes a rectangular opening 22 which is adapted to line up with the rear window of the viewfinder of the camera to permit the user to look through the viewfinder when the camera is in the case and the cover flap, to be later described, is opened up. The central section or wall 20 of the case section is bounded by spaced parallel creased portions 23 and 24 along which the side wall sections 25 and 26 of the case section may be folded or bent up at substantially right angles to the back wall 20 to form the side walls of the case. The side wall 26 is provided with a notch 27 through which the shutter trigger 15 of the camera is accessible, see FIG. 3, and the bend between the back wall and the side wall 26 is provided with a rectangular opening 28 through which the lamp ejector of the camera will be accessible for actuation.

Figure 4:
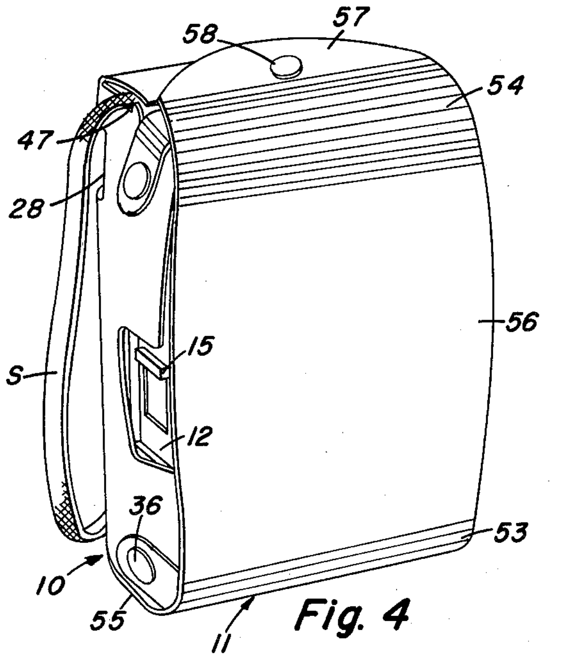
FIG. 4 is a perspective view showing the completely assembled carrying case with a camera therein.

The case section 10 is provided with another creased portion 30 which bounds the top edge of the back wall 20 and along which the top wall section 31 of the case section may be folded or bent at substantially right angles to the back wall to form the top wall of the assembled case, see FIGS. 2–4. A T-shaped retainer strap 32, made of any flexible material, i.e., polyethylene, etc., has the free end of its leg 33 fastened to the inside surface of the back wall 20 adjacent the bottom thereof by any suitable means, here shown as being riveted to the back wall 20 by the conventional attachment to said wall of one of a pair of male snap fasteners 35 which are used to attach the cover flap 11 to the case section as will be described below. The ends of the cross member of the T-shaped retainer strap 32 are provided with the female members 36 of snap fastening means which are adapted to engage the male members 37 riveted into the lower corners of the side walls 25 and 26. As shown in FIGS. 2 and 3, when the side walls 25 and 26 are folded upwardly and the retainer strap 32 is bent up and the snap fasteners 36 and 37 are engaged, the retainer strap holds the lower ends of the side walls in assembled relation and the leg 33 of the retainer strap is adapted to engage the bottom of the camera while the cross member is adapted to engage the front wall of the camera at its lower edge. This arrangement prevents the camera from slipping out of the bottom of the case when the cover flap 11 is not in a closed position. This retainer strap 32 need not be of the specific form shown, but the same result could be obtained by a straight strap permanently fastened at one end to one side wall and having a snap fastener at its other end to engage a cooperating fastener member fixed to the opposite side wall. In order to prevent the camera from sliding through the bottom of the case this last mentioned form of strap would be disposed to extend across the open side of the case just below the lens mount of the camera so as to underlie the same and thereby hold the camera against movemen relative to the case in a downward direction. In other words, this engagement of the strap with the lower edge of the lens mount would serve the same purpose as the leg 33 of the T-shaped retainer strap shown in the drawings. In the embodiment shown, the leg 33 of the retainer strap is offset to one side of the center of the case to permit access to the film winding knob K which lies at one side of the bottom wall of the camera.

After the retainer strap 32 is snapped into assembled position, and the case is in the condition shown in FIG. 2, the camera may be slipped into the case from the top so that its lower end is retained by the retainer strap 32. Then the top wall 31 is bent forwardly along creased portion 30 and female snap member 40 on the ends of transverse tips or wings 41 on the cover are snapped into engagement with cooperating male snap members 42 on the upper corners of the side walls 25 and 26. Now the case section is completely assembled with the camera situated therein in such a way that the camera can be operated while in the case, see FIG. 3. The only time the camera must be removed from the assembled case section is for unloading and reloading it with film.

The camera may be provided with a carrying strap S, the opposite ends of which are attached to the side walls of the camera body by clips 45 fixed to the ends of the strap and engaging perforated ears or lugs 46 on the camera body. So that this carrying strap can be used to carry the combined camera and carrying case, thus making it unnecessary to provide the case itself with a carrying strap, means are provided in the case to allow the strap to extend through the top wall thereof when the case is assembled around the camera. To this end, the top wall is made slightly narrower than the space between the side walls 25 and 26 to allow the carrying strap S to extend therebetween. To provide this opening for the strap S without leaving too much of a gap between the top and side walls I have provided the top edge of each side wall with a notch 47 which is substantially as wide as the strap and as deep as the thickness of the strap, see FIGS. 1, 2 and 4. If desired, the side walls 25 and 26 may be provided with openings adjacent the attaching clips 45 through which the carrying strap can be extended for normal use.

For completely closing the camera within the case the bottom edge of the cover flap has fixedly fastened thereto a flexible hinge member 50 made of any suitable pliable material, i.e., polyethylene or the like. This hinge member has two female snap fasteners 51 adapted to engage the male fasteners 35 fixed to the bottom edge of back wall 20 and thereby connect the cover flap to the case in the manner shown in FIG. 2. The lower edge of the back wall 20 is provided with a cutout 52 of such configuration as to receive the hinge member 50 and thereby allow a close fit between the bottom edge of the cover flap and the bottom edge of the back wall 20 when the cover flap is folded to its closed position, see FIG. 4. The cover flap 11 is provided with spaced parallel creased portions 53 and 54 which allow the same to be bent to form a bottom wall 55 and a front wall 56 for the carrying case when the cover is moved to its closed position as shown in FIG. 4. A tab portion 57 at the top end of the cover flap has a female snap fastener 58 fixed thereto which is adapted to engage male snap fastener 59 on the top wall 31 of the case section to hold the cover flap in a closed position when the camera is not in use. When the camera is in use the cover flap 11 may be allowed to hang down as shown in FIG. 2, or it can be completely removed from the case section by unsnapping the hinge portion 50 from the back wall of the case section.

While I have shown and described certain specific embodiments of my invention I am fully aware that other modifications thereof are possible. My invention, therefore, is not to be limited to the precise structural details shown and described, but is intended to cover all modifications coming within the scope of the appended claims.

Having thus disclosed my invention, what I claim as new and novel and desire to secure by Letters Patent of the United States is:

1. A collapsible carrying case for a camera comprising in combination a case section formed from a flat sheet of material the central portion of which constitutes the back wall of said case, said case section having spaced and parallel scored portions bounding the sides of said central portion along which portions of said case section extending beyond the sides of said back wall may be folded up substantially at right angles to the back wall to form the side walls of said case, said case section having a further scored portion bounding the top of said back wall and extending at right angles to said first mentioned scored portions along which a portion of the case section extending beyond the top of said back wall may be folded up at substantially right angles to the back wall to form the top wall of the case; cooperating snap fasteners on the corners of said top wall and the upper corners of said side walls to fasten these parts in a folded position; a flexible camera retaining strap fastened at one end to the bottom of said back wall and adapted to fold up from an inoperative position, in which it lies substantially in the plane of said back wall, to a retaining position, in which it extends across the open bottom of the case and across the bottom of the open front of the case to engage the bottom and front wall of a camera placed in said case to prevent the camera from dropping out of the bottom of said case; cooperating snap fasteners on the free ends of said retaining strap and the lower corners of said side walls to retain said strap in its operative position and the lower ends of said side walls in a folded position; a separate, flat elongated flap provided with spaced parallel scored portions along which said flap can be folded to form the bottom and front walls of said case, means for detachably hinging the end of said flap forming the bottom wall of said case to the bottom edge of said back wall; and cooperating snap fastening means on the other end of said cover flap and the front edge of said top wall of the case for holding said cover flap in a closed position on said case wherein it forms the bottom and front walls of the case.

2. A collapsible camera carrying case according to claim 1 which is adapted to house a camera having a carrying strap connected to and extending from both side walls thereof, and provided with suitable openings at the junction of the edges of the top wall and the side walls through which the camera carrying strap may extend to permit the use of the same when the camera is within the case.

3. In a carrying case for a box type camera the combination of a case section including a back wall, two side walls and a top wall formed from a single piece of material stamped from a flat piece of simulated leather or the like material and provided with creased portions to permit said side and top walls to be folded up from said back wall to embrace the side walls and top of said camera, wing portions extending laterally from opposite sides of said top wall; cooperating releasable fastening means on the ends of said wing portions and on the outside of the upper ends of said side walls to hold the top wall and the upper ends of said side walls in cooperating relation, means for confining the lower end of a camera within said case section and holding the lower ends of said side walls in assembled relation and including a flexible T-shaped strap having the free end of its leg attached to the back wall adjacent its cooperating bottom edge, releasable fastening means on the ends of the cross bar of the T-shaped strap and the outside of the lower ends of said side walls, and an elongated flat cover flap separate from the case section and provided with transverse creased portions at which the flap may be folded to form the bottom and front walls of said carrying case; cooperating releasable fastening means on one end of said cover flap and the bottom of said back wall to detachably connect the cover flap to said case section; and cooperating snap fasteners on the other end of said cover flap and said top wall to hold said cover flap in position where it completes, and forms the bottom and front walls of, said carrying case.

References Cited in the file of this patent

UNITED STATES PATENTS

| | | |
|---|---|---|
| D. 156,685 | Weiss | Dec. 27, 1949 |
| D. 161,409 | Bachi | Jan. 2, 1951 |
| 1,088,885 | Dorris | Mar. 3, 1914 |
| 2,308,003 | Gamrod | Jan. 12, 1943 |